United States Patent
Hieda et al.

(10) Patent No.: US 9,889,845 B2
(45) Date of Patent: Feb. 13, 2018

(54) STRADDLED VEHICLE

(71) Applicant: YAMAHA HATSUDOKI KABUSHIKI KAISHA, Iwata-shi, Shizuoka-ken (JP)

(72) Inventors: Kazuya Hieda, Iwata (JP); Shogo Nakamura, Iwata (JP)

(73) Assignee: YAMAHA HATSUDOKI KABUSHIKI KAISHA, Iwata-Shi, Shizuoka-Ken (JP)

(*) Notice: Subject to any disclaimer, the term of this patent is extended or adjusted under 35 U.S.C. 154(b) by 1 day.

(21) Appl. No.: 14/794,423

(22) Filed: Jul. 8, 2015

(65) Prior Publication Data
US 2016/0009275 A1 Jan. 14, 2016

(30) Foreign Application Priority Data
Jul. 8, 2014 (JP) .................. 2014-140266

(51) Int. Cl.
*B60W 30/04* (2006.01)
*B60W 10/04* (2006.01)
(Continued)

(52) U.S. Cl.
CPC ............ *B60W 30/04* (2013.01); *B60K 28/16* (2013.01); *B60T 8/17* (2013.01); *B60T 8/175* (2013.01);
(Continued)

(58) Field of Classification Search
CPC .................................... B60W 30/04
See application file for complete search history.

(56) References Cited

U.S. PATENT DOCUMENTS 8,958,968 B2* 2/2015 Kobayashi ............ B60K 28/16
180/197
2007/0179735 A1* 8/2007 Fiedler ................ B60R 21/0132
702/150
(Continued)

FOREIGN PATENT DOCUMENTS

EP 2031281 A2 3/2009
JP 10324191 A 12/1998
(Continued)

OTHER PUBLICATIONS

Japanese Office Action dated Jul. 28, 2015.

*Primary Examiner* — Redhwan k Mawari
*Assistant Examiner* — Michael Whalen
(74) *Attorney, Agent, or Firm* — Rabin & Berdo, P.C.

(57) ABSTRACT

A straddled vehicle includes a front wheel, a rear wheel, an engine which generates a driving force and rotates the rear wheel with the driving force, a front wheel brake and a rear wheel brake which lowers the rotation speed of at least the rear wheel, a first detector which acquires and outputs a pitch rate, a second detector which detects and outputs information concerning rotation of the front wheel, and an ECU including a front wheel lift determination circuit which monitors respective outputs from the first detector and the second detector to determine whether a front wheel lift exists based on at least one of the pitch rate and information concerning rotation of the front wheel. When the front wheel lift exists, the ECU controls the driving source or the braking device so that the driving force is lowered or the rotation speed of the rear wheel is lowered.

23 Claims, 7 Drawing Sheets

(51) Int. Cl.
*B60W 10/184* (2012.01)
*B60K 28/16* (2006.01)
*B60T 8/17* (2006.01)
*B60T 8/175* (2006.01)

(52) U.S. Cl.
CPC ........... *B60T 8/1706* (2013.01); *B60W 10/04* (2013.01); *B60W 10/184* (2013.01); *B60T 2240/06* (2013.01); *B60W 2030/041* (2013.01); *B60W 2300/36* (2013.01); *B60W 2400/00* (2013.01); *B60W 2520/16* (2013.01); *B60W 2520/28* (2013.01); *B60W 2720/16* (2013.01)

(56) References Cited

U.S. PATENT DOCUMENTS

| | | | |
|---|---|---|---|
| 2011/0035089 A1* | 2/2011 | Hirao | B60G 17/06 701/31.4 |
| 2011/0166744 A1* | 7/2011 | Lu | B60T 8/1755 701/29.2 |
| 2013/0261914 A1* | 10/2013 | Ingram | B64C 39/024 701/70 |
| 2013/0261925 A1 | 10/2013 | Kobayashi et al. | |
| 2016/0009275 A1* | 1/2016 | Hieda | B60W 30/04 701/70 |
| 2017/0080769 A1* | 3/2017 | Kurita | B62K 25/04 |

FOREIGN PATENT DOCUMENTS

| | | | |
|---|---|---|---|
| JP | 2000-108872 A | 4/2000 | |
| JP | 2006-274869 A | 10/2006 | |
| JP | 2007-271606 A | 10/2007 | |
| JP | 2010-229912 A | 10/2010 | |
| JP | 2010-229912 A | 10/2010 | |
| JP | 2010229912 A * | 10/2010 | |
| JP | 2010-285987 A | 12/2010 | |
| JP | 2011-068253 A | 4/2011 | |
| JP | 2011-137416 A | 7/2011 | |
| JP | 2011-137416 A | 7/2011 | |
| JP | 5271137 B2 * | 8/2013 | |
| JP | 2013209047 A | 10/2013 | |
| WO | WO 2015163426 A1 * | 10/2015 | B62K 25/04 |

* cited by examiner

STRADDLED VEHICLE

CROSS-REFERENCE TO RELATED APPLICATION

This application is based on Japanese Patent Application No. 2014-140266 filed on Jul. 8, 2014 the entire contents of which are hereby incorporated by reference.

BACKGROUND

1. Technical Field

The present application relates to a straddled vehicle, and more particularly to a straddled vehicle which can detect a front wheel lift and control driving force so as to reduce the front wheel lift.

2. Description of the Related Art

Straddled vehicles such as motorcycles and all-terrain vehicles are vehicles which are driven by the rear wheel. In a straddled vehicle, under a large driving force being transmitted to the rear wheel, or when the driving force of the rear wheel is abruptly increased, the front wheel may be lifted off the ground. Such a lift of the front wheel is referred to as a "front wheel lift" or a "wheelie".

In a state of front wheel lift, the straddled vehicle travels only via the rear wheel, thus possibly resulting in an insufficient running stability. Therefore, Japanese Laid-Open Patent Publication No. 2011-137416 discloses a technique which, when a straddled vehicle enters a state of front wheel lift, quickly ends the front wheel lift; this technique detects a front wheel lift, and lowers the driving force when determining that a front wheel lift has occurred.

SUMMARY

The straddled vehicle disclosed herein detects a state of front wheel lift in a more pertinent manner than do conventional techniques, and reduces the front wheel lift.

A straddled vehicle according to an embodiment of the present application comprises: at least one front wheel; at least one rear wheel; a driving source which generates a driving force and rotating the rear wheel with the driving force; a braking device which lowers a rotation speed of at least the rear wheel; a first detector which acquires and outputs a pitch rate; a second detector which detects and outputs information concerning rotation of the front wheel; and a controller including a front wheel lift determination circuit which monitors respective outputs from the first detector and the second detector to determine whether a front wheel lift exists or not based on at least one of the pitch rate and the information concerning rotation of the front wheel, the controller controlling the driving source or the braking device when it is determined that a front wheel lift exists.

The pitch rate is an angular velocity around an axis which extends laterally to the direction of travel of the straddled vehicle. When a front wheel lift occurs, the pitch rate abruptly increases. Thus, the straddled vehicle according to an embodiment of the present application is able to detect occurrence of a front wheel lift comparatively early, and control the front wheel lift.

With the straddled vehicle disclosed herein, it is possible to determine the occurrence of a front wheel lift early on, and effectively reduce the front wheel lift by appropriately suppressing the driving force.

These general and specific aspects may be implemented using a system, a method, and a computer program, and any combination of systems, methods, and computer programs.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

DETAILED DESCRIPTION

Figure 1:
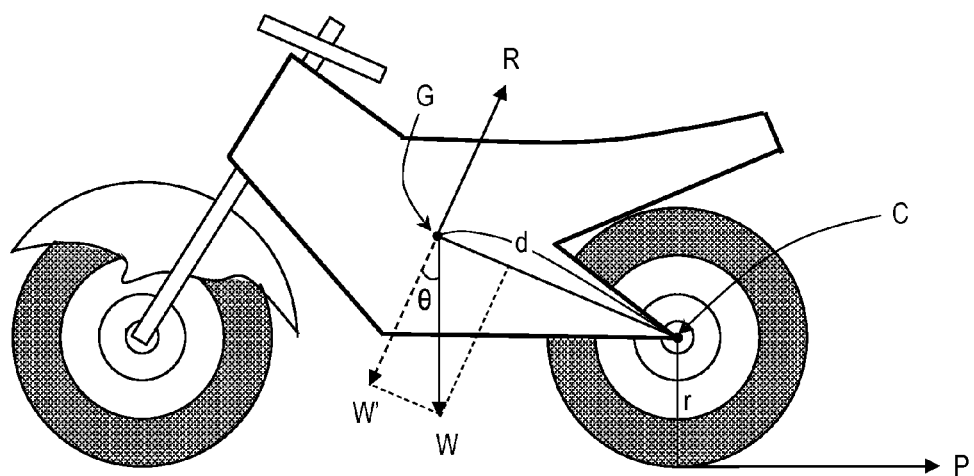
FIG. 1 is a schematic diagram for explaining how a front wheel lift occurs.

First, with reference to FIG. 1, the reasons why a front wheel lift occurs under an excessive driving force, and the control for reducing a front wheel lift, will be described. FIG. 1 shows forces which a motorcycle receives while the motorcycle is traveling with acceleration. It is assumed that there is sufficiently large resistance between the rear wheel and its plane of ground contact, and that the driving force by the engine is also sufficiently large. When the motorcycle accelerates with a force P, a drag force R which is received at the plane of ground contact of the rear wheel acts at the center of gravity G of the motorcycle. The drag force R is expressed by r×P=R×d, R=(r/d)P, where a moment around the axis C of the rear wheel is taken into account.

Assuming a force component W' of the gravity W acting on the motorcycle, the component W' being parallel to the drag force R, the vehicle body of the motorcycle will rotate around an axis C when R>W'. That is, the front wheel will leave the plane of ground contact, resulting in a front wheel lift. If R≤W', the vehicle body of the motorcycle will rotate in the opposite direction around the axis C, which places the front wheel in contact with the ground. Therefore, the front wheel lift can be eliminated by reducing the force P so that R≤W'. In other words, the driving force may be lowered if a front wheel lift occurs.

The inventors have investigated into conventional techniques of detecting a front wheel lift and lowering the driving force. As a result, it was found that the conventional techniques may in some cases be slow in detecting a front wheel lift, thus being unable to efficiently reduce the front wheel lift. Although the conventional techniques do not specify in detail how the driving force is reduced when a front wheel lift is detected, it was also found that the front wheel may become lifted further again in some control methods, even after the driving force is suppressed.

In view of such problems, the inventors have arrived at a straddled vehicle which detects a front wheel lift and alleviates the state of front wheel lift.

In order to detect a state of front wheel lift with greater certainty, the straddled vehicle of the present embodiment determines whether a state of front wheel lift exists or not based on the pitch rate and the rotation speed of the front wheel. Moreover, in order to ensure more appropriate suppression of driving force, in order to end the state of front wheel lift, the height by which the front wheel is lifted is taken into account for the driving force suppression. Moreover, the driving force is controlled so as to reduce a recurring front wheel lift during the driving force suppression.

Hereinafter, an embodiment of a straddled vehicle according to the present invention will be described by taking a motorcycle as an example. A straddled vehicle is ridden by a rider who sits on its saddle-shaped seat, which means that the center of gravity during riding is relatively high, as compared to that of a car. As such, a straddled vehicle is liable to a front wheel lift when the driving force is excessive. Therefore, the present invention can also be suitably applied to straddled vehicle forms other than motorcycles, e.g., all-terrain vehicles. Note that "straddled vehicles" also include four-wheeled types and three-wheeled types, where three-wheeled straddled vehicles include those having two front wheels and those having two rear wheels.

The motorcycle described below includes an engine as a driving source, which drives a single rear wheel. Moreover, the motorcycle includes a brake, as a braking device for lowering the rotation speed of at least the rear wheel. The single front wheel of the motorcycle is a driven wheel, to which driving force is not transmitted. In the case of a straddled vehicle, it includes at least one driving wheel and at least one front wheel. The driving source is not limited to an engine, but it may be any rotation power unit that drives the rear wheel to rotate, e.g., an electric motor.

Hereinafter, with reference to the drawings, an embodiment of a motorcycle, as a kind of straddled vehicle, will be described. In the following description, any reference to "front/rear" and "right/left" is based on the direction in which the motorcycle travels forward.

1. Construction of Motorcycle 1

Figure 2:
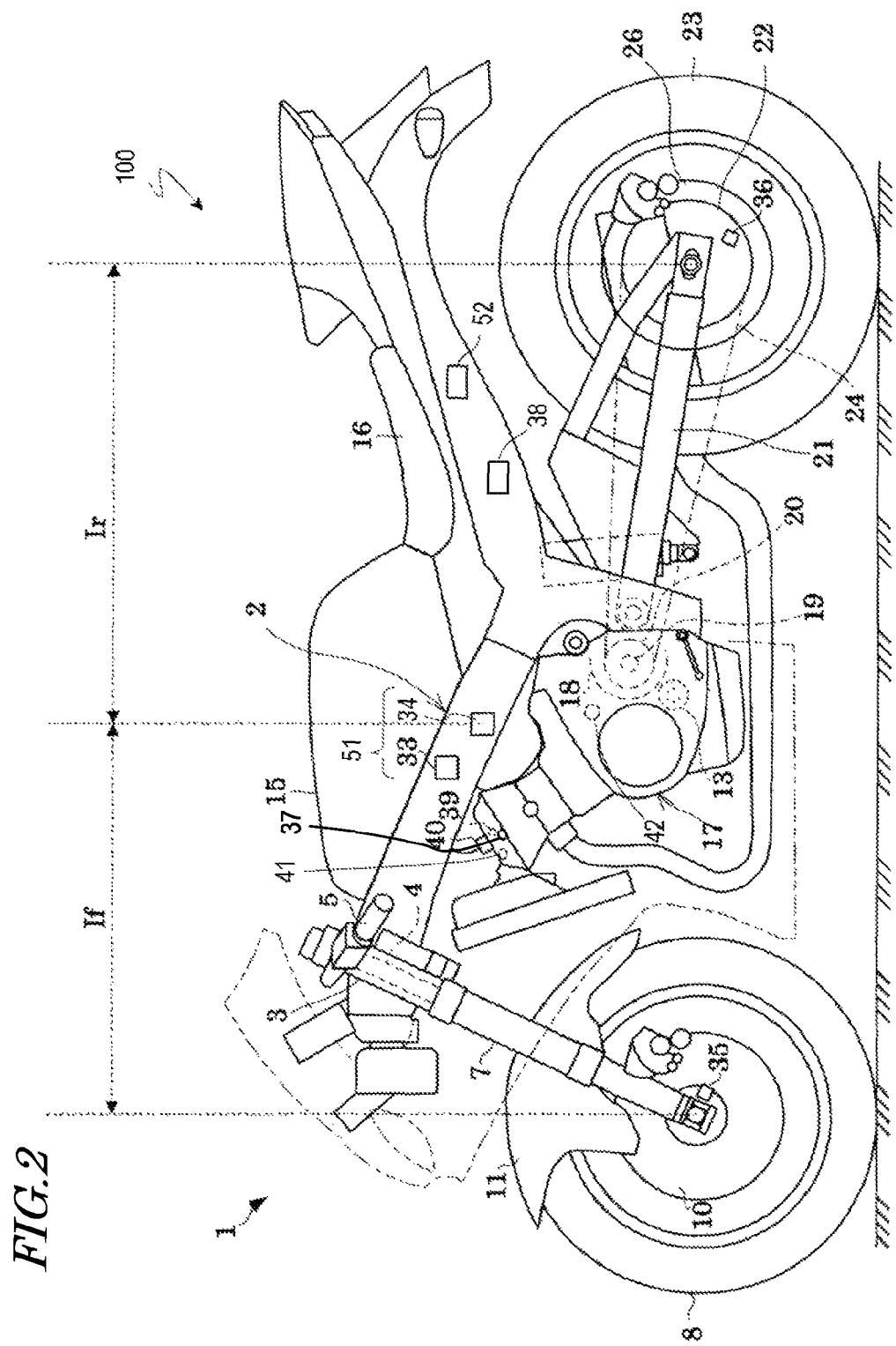
FIG. 2 is a side view of a motorcycle according to an embodiment.

FIG. 2 is a side view schematically showing the construction of the motorcycle of the present embodiment. The motorcycle 1 includes a main frame 2. A head pipe 3 is provided at an upper portion of the front end of the main frame 2. A steering shaft 4 is inserted in the head pipe 3. Handle bars 5 are linked at an upper end of the steering shaft 4. A brake lever (not shown) is provided on the right handle bar 5.

At a lower end of the steering shaft 4, a pair of front forks 7 which are capable of contraction and expansion are linked. This allows the front forks 7 to swing with the turning of the handle bars 5. A front wheel 8 is rotatably attached at lower ends of the front forks 7. Vibration of the front wheel 8 is absorbed by the contraction and expansion of the front forks 7. Moreover, a front wheel brake 10 is attached at lower ends of the front forks 7, so that rotation of the front wheel 8 is braked with manipulation of the brake lever. A front-wheel rotation speed sensor (second detector) 35 which detects and outputs the rotation speed of the front wheel 8 is also provided near the lower end of the front forks 7. A front wheel cover 11 is fixed to the front forks 7, above the front wheel 8.

A fuel tank 15 and a seat 16 are retained at an upper portion of the main frame 2 so as to flank each other in the front-rear direction. An engine 17 and a transmission 18 are retained by the main frame 2, below the fuel tank 15. On the engine 17, a spark plug 39, a fuel injector 40, and a throttle actuator 41 are provided. Moreover, a throttle sensor 37 which detects and outputs the throttle position and a driving source rotation rate sensor 42 which detects and outputs the rotation rate of the engine are also provided.

A clutch 13 is provided between the engine 17 and the transmission 18. The transmission 18 includes a drive shaft 19 for outputting motive power generated in the engine 17. A drive sprocket 20 is linked to the drive shaft 19. The clutch 13 allows or disallows the motive power generated by the engine 17 to be output to the drive shaft 19. The transmission 18, which includes a plurality of gears, drives the drive shaft 19 to be rotated while the revolutions of the engine 17 is converted with a selected one of a plurality of transmission ratios.

A swing arm 21 is swingingly supported at the lower rear of the main frame 2. At a rear end of the swing arm 21, a driven sprocket 22 and a rear wheel 23 are rotatably supported. A rear-wheel rotation speed sensor 36 which detects and outputs the rotation speed of the rear wheel 23 is provided near the driven sprocket 22. A rear wheel brake 26 which is operated by a pedal brake pedal (not shown) is provided on the rear wheel 23. A chain 24 is suspended between the drive sprocket 20 and the driven sprocket 22. The driving force generated by the engine 17 is transmitted to the rear wheel 23 via the clutch 13, the transmission 18, the drive shaft 19, the drive sprocket 20, the chain 24, and the driven sprocket 22.

Below the seat 16, an ECU (Electronic Control Unit) for controlling the operation of each circuit of the motorcycle 1 is provided. The ECU 52 is composed of a microcomputer, a memory storing a program which defines a procedure for controlling the operation of each circuit of the motorcycle 1, a processor, computer readable storage media that is hardware, and the like. The computer readable storage media may store instructions for implementing instructions of a controller, as discussed below. The computer readable storage media may be hardware and non-transitory, as opposed to computer readable transmission media which includes signals for example.

The motorcycle 1 further includes an inertia measurement device 51, which includes an acceleration sensor 34 and a gyroscope (first detector) 33, in order to detect a front wheel lift.

Figure 3:
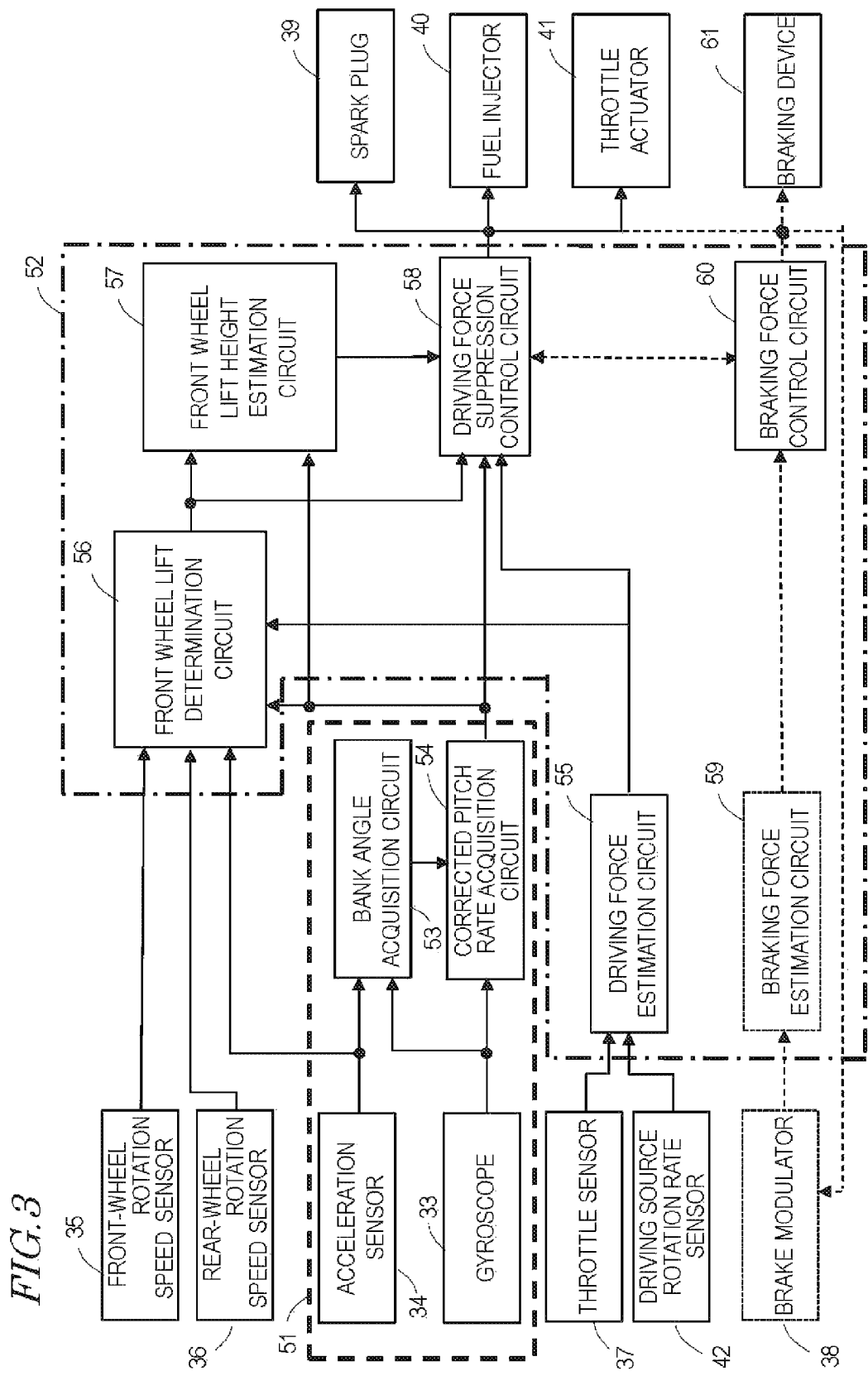
FIG. 3 is a block diagram showing the construction of an inertia measurement device and an ECU according to an embodiment.
Figure 4:
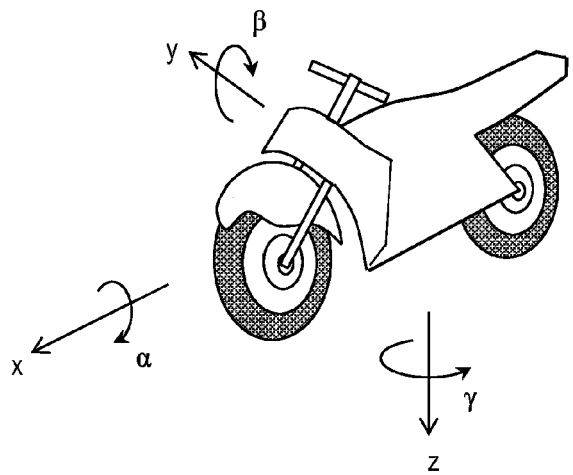
FIG. 4 is a diagram showing the six axes along which to measure inertial force in a motorcycle.

FIG. 3 shows a functional block diagram of the inertia measurement device 51 and the ECU 52. In the present embodiment, the motorcycle 1 includes a 6-axis inertia measurement unit as the inertia measurement device 51, for example. The acceleration sensor 34 and the gyroscope 33 detect acceleration and angular velocity, respectively, along three axes. FIG. 4 shows six inertial forces that act on the motorcycle 1. As shown in FIG. 4, the acceleration sensor 34 detects acceleration along the x axis direction, which is the front-rear direction of the motorcycle 1, the y axis direction, which is the lateral direction, and the z axis direction, which is the vertical direction. The gyroscope 33 detects a bank rate α (roll rate) around the x axis, a pitch rate β around the y axis, and a yaw rate γ around the z axis.

The motorcycle 1 at least acquires a pitch rate, in order to detect a front wheel lift and alleviate the state of front wheel lift. This pitch rate may be directly determined by the gyroscope 33 as an angular velocity around the y axis, or acquired through calculation from an angular velocity around another axis. The gyroscope 33 may be composed of a plurality of angular velocity sensors or the like.

In the present specification, the terms "detect" and "acquire" are differentiated as follows, in principle. To "detect physical parameter a" means to obtain information concerning a value (measured value) of physical parameter a through measurement of physical parameter a. To "acquire physical parameter a" encompasses to "detect physical parameter a" and also to determine the value of physical parameter a based on information which is detected by a sensor or the like.

In order to detect a state of front wheel lift with higher accuracy, the inertia measurement device 51 preferably acquires acceleration along the x axis direction, i.e., the longitudinal direction of the motorcycle 1. For this reason, the acceleration sensor 34 at least detects acceleration along the x axis direction.

As will be described in detail below, for a more appropriate detection of a state of front wheel lift, it is preferable to rely on the pitch rate along the vertical direction, so as to account for the attitude of the motorcycle 1. Therefore, the inertia measurement device 51 includes: a bank angle acquisition circuit 53 which acquires a bank angle by applying time integration to a bank rate that is received from the gyroscope 33, and outputs the resultant bank angle; and a corrected pitch rate acquisition circuit 54 which corrects the pitch rate by using the bank angle and a yaw rate obtained from the gyroscope 33.

As shown in FIG. 3, the ECU 52 includes a front wheel lift determination circuit 56, a front wheel lift height estimation circuit 57, a driving force suppression control circuit 58, and a driving force estimation circuit 55. The respective functions of these circuits are realized as the microcomputer reads a program which is stored in the memory and executes it. In addition to these constituent elements, the ECU 52 may have a function of controlling various circuits of the motorcycle 1. Although the present embodiment illustrates the front wheel lift determination circuit 56, the front wheel lift height estimation circuit 57, the driving force suppression control circuit 58 as being parts of the ECU 52, they may instead be included in a control unit(s) or the like other than the ECU 52.

The front wheel lift determination circuit 56 receives a corrected pitch rate obtained from the corrected pitch rate acquisition circuit 54 and a rotation speed of the front wheel obtained from the front-wheel rotation speed sensor 35 either incessantly or at predetermined time intervals, and based on the corrected pitch rate and the rotation speed of the front wheel, determines whether a state of front wheel lift exists or not. Specifically, the front wheel lift determination circuit 56 monitors the corrected pitch rate and the rotation speed of the front wheel, and determines a state of front wheel lift when at least one of them satisfies a predetermined criterion.

When determining a state of front wheel lift, the ECU 52 controls the engine 17 to reduce the output of the engine 17.

Specifically, the front wheel lift height estimation circuit 57 of the ECU 52 receives a signal from the front wheel lift determination circuit 56 indicating that a state of front wheel lift has been detected, and estimates how much the front wheel 8 is lifted relative to the plane of ground contact of the rear wheel 23. To this end, the front wheel lift height estimation circuit 57 determines a pitch angle by subjecting the corrected pitch rate to integration. Alternatively, the inertia measurement device 51 may determine a pitch angle by subjecting the corrected pitch rate to integration, and output it to the front wheel lift height estimation circuit 57. The front wheel lift height estimation circuit 57 estimates a front wheel lift height by using the pitch angle and the wheelbase of the motorcycle 1.

Based on the corrected pitch rate being obtained from the corrected pitch rate acquisition circuit 54 and the height by which the front wheel is lifted being obtained from the front wheel lift height estimation circuit 57, the driving force suppression control circuit 58 controls the engine 17 so that the output of the engine 17 is reduced. More specifically, the driving force suppression control circuit 58 calculates an amount of decrease (control amount) by which the output is to be reduced, subtracts the amount of decrease from the amount of driving force that is output from the driving force estimation circuit 55, and outputs this corrected amount of driving force to the spark plug 39, the fuel injector 40, and the throttle actuator 41. As a result, the output of the engine 17 is suppressed to arrive at a driving force which is reduced from the driving force that was intended by the rider; because of the reduced driving force, the front wheel lift is reduced. Furthermore, the rotation speed of the rear wheel 23 is reduced by reducing the output of the engine 17.

2. Control of Motorcycle 1

Figure 5:
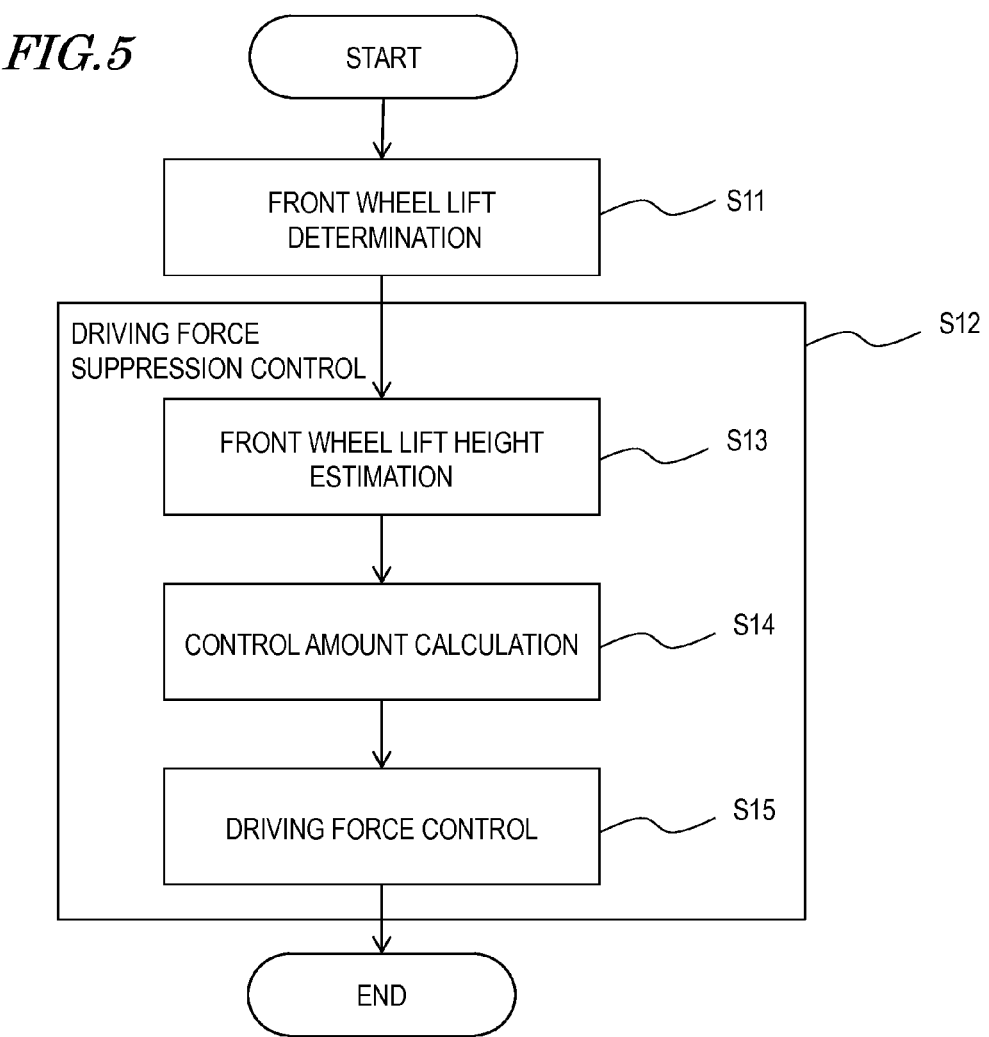
FIG. 5 is a flowchart showing a procedure of front wheel lift determination and driving force suppression control.

Next, with reference to FIG. 2 and FIG. 5, a front wheel lift determination and a driving force control for reducing the front wheel lift in the motorcycle 1 will be described. FIG. 5 is a flowchart showing the procedure of front wheel lift determination and driving force control for reducing the front wheel lift. First, as shown in FIG. 5, the front wheel lift determination circuit 56 determines whether a front wheel lift has occurred or not during travel of the motorcycle 1 (S11).

Figure 6:
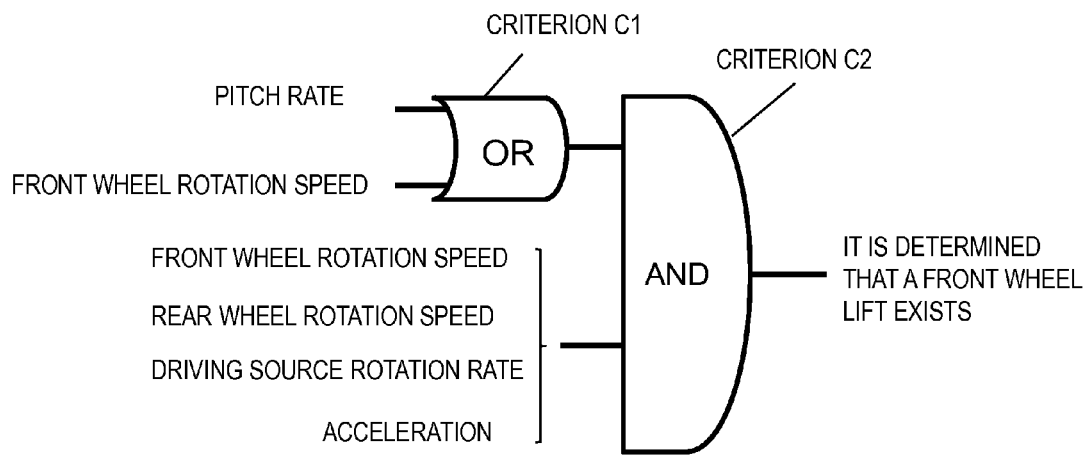
FIG. 6 is a schematic diagram describing an operation by a front wheel lift determination circuit.

FIG. 6 shows signals which are input to the front wheel lift determination circuit 56 and determination criteria therefor. The front wheel lift determination circuit 56 consecutively receives the pitch rate being output from the inertia measurement device 51 and the rotation speed of the front wheel being output from the front-wheel rotation speed sensor 35, and as indicated by criterion C1, when at least one of the pitch rate and the rotation speed of the front wheel satisfy a predetermined criterion(s), determines that a front wheel lift has occurred.

The pitch rate is an angular velocity around an axis which extends laterally to the direction of travel of the motorcycle 1. When a front wheel lift occurs, the pitch rate abruptly increases, thus permitting a comparatively early detection of a front wheel lift. For example, when the pitch rate becomes equal to or greater than a predetermined value, or exceeds the predetermined value, it may be determined that a front wheel lift has occurred. In contrast, the pitch angle will not increase until the front wheel is somewhat lifted off the plane of ground contact; therefore, it is difficult to determine a front wheel lift by using the pitch angle. On the other hand, trying to detect a front wheel lift within a range of smaller pitch angles will induce errors.

In order to more accurately determine a front wheel lift from the pitch rate, it is preferable to use a corrected pitch rate that is determined based on the motorcycle's vertical direction, which is irrespective of the attitude of the motorcycle 1. This why, as mentioned earlier, the bank angle acquisition circuit 53 of the inertia measurement device 51 receives the bank rate obtained from the gyroscope 33, subjects it to time integration to acquire a bank angle A, which is then output. The corrected pitch rate acquisition circuit 54 corrects the pitch rate β by using the bank angle A and the yaw rate γ obtained from the gyroscope 33. The correct pitch rate, designated β', can be determined as follows.

corrected pitch rate β'=pitch rate β×cos(bank angle A)−yaw rate γ×sin(bank angle A).

Moreover, when a front wheel lift occurs, driving force ceases to be transmitted to the front wheel; as a result, the rotation speed of the front wheel is decreased. Therefore, it may be determined that a front wheel lift has occurred when a predetermined or more change occurs in the rotation speed of the front wheel, for example. In order to detect a front wheel lift from the rotation speed of the front wheel with greater certainty and early on, a first derivative of the rotation speed of the front wheel with respect to time may be used, for example. Immediately before a front wheel lift occurs, the rotation speed of the front wheel is on the increase because the motorcycle 1 is accelerating. If a front wheel lift then occurs, the rotation speed of the front wheel decreases, so that the first derivative of the rotation speed of the front wheel with respect to time changes from positive to negative before and after the occurrence of the front wheel lift. Therefore, it may be determined that a front wheel lift has occurred when a change of the first derivative of the rotation speed of the front wheel from positive to negative is detected. Moreover, since the first derivative of the rotation speed of the front wheel changes from positive to negative, a second derivative of the rotation speed of the front wheel with respect to time will take a negative value, with a large absolute value, before and after the occurrence of a front wheel lift. On the other hand, the second derivative would take a value near approximately zero before or after any front wheel lift. Therefore, it may be determined that a front wheel lift has occurred when an absolute value of the second derivative of the rotation speed of the front wheel with respect to time becomes equal to or greater than a predetermined value. Thus, by using a time derivative value of rotation speed, it becomes possible to determine a front wheel lift with greater certainty. In other words, by receiving information concerning the rotation of the front wheel, e.g., rotation speed, first derivative of rotation speed, and second derivative of rotation speed, the front wheel lift determination circuit 56 can detect a front wheel lift without delay when the front wheel lift occurs.

The front wheel lift determination circuit 56 monitors both of the pitch rate and the rotation speed of the front wheel, and determines that a front wheel lift has occurred when one of the pitch rate and the rotation speed of the front wheel satisfies a predetermined criterion, thus being able to detect a front wheel lift comparatively early. This marks a difference from any kind of control that determines a front wheel lift based only on the rotation speed of the front wheel. Alternatively, it may be determined that a front wheel lift has occurred when both of the pitch rate and the rotation speed of the front wheel satisfy predetermined criteria.

However, depending on various travel conditions, there is a possibility that criterion C1 might be satisfied even when a front wheel lift has not actually occurred. Therefore, a more certain detection of a front wheel lift may be made by combining criterion C1 with criterion C2 under which a front wheel lift is unlikely to occur, or with criterion C2 under which a front wheel lift is likely to occur. Specifically, at least one of the following may be used for front wheel lift determination: the rotation speed of the front wheel being output from the front-wheel rotation speed sensor 35, (second detector), the rotation speed of the rear wheel being output from the rear-wheel rotation speed sensor (third detector) 36, the driving source rotation rate being obtained from the driving source rotation rate sensor (third detector) 42, and the longitudinal acceleration of the motorcycle 1 being output from the acceleration sensor (third detector) 34 of the inertia measurement device 51.

For example, when a front wheel lift occurs, the rotation speed of the front wheel decreases, but the rotation speed of the rear wheel increases or remains approximately constant, so that the difference in rotation speed between the front wheel and the rear wheel keeps increasing. On the other hand, in the absence of a front wheel lift, the difference in rotation speed between the front wheel and the rear wheel is approximately zero. Therefore, it may be determined that a front wheel lift has occurred when criterion C1 is satisfied and yet criterion C2 is satisfied, where criterion C2 stipulates that the difference in rotation speed between the front wheel and the rear wheel is equal to or greater than a predetermined value.

Moreover, a front wheel lift occurs when there is a large driving force of the engine and when an acceleration is a predetermined value or more. Therefore, it may be determined that a front wheel lift has occurred when criterion C1 is satisfied and yet criterion C2 is satisfied, where criterion C2 stipulates that the driving source rotation rate or the longitudinal acceleration is equal to or greater than a predetermined value.

Moreover, when criterion C1 concerning the pitch rate is satisfied, indicating that a front wheel lift may have occurred, the first derivative and the second derivative of the front wheel rotation speed will undergo the aforementioned changes if a front wheel lift actually exists. Therefore, changes in the first derivative and the second derivative of the front wheel rotation speed may be detected as criterion C2, which, if satisfied, concludes that a front wheel lift has occurred. If the front wheel lift determination circuit 56 indeed determines that a front wheel lift has occurred, a signal indicating occurrence of a front wheel lift is output to the front wheel lift height estimation circuit 57 and the driving force suppression control circuit 58.

Figure 7:
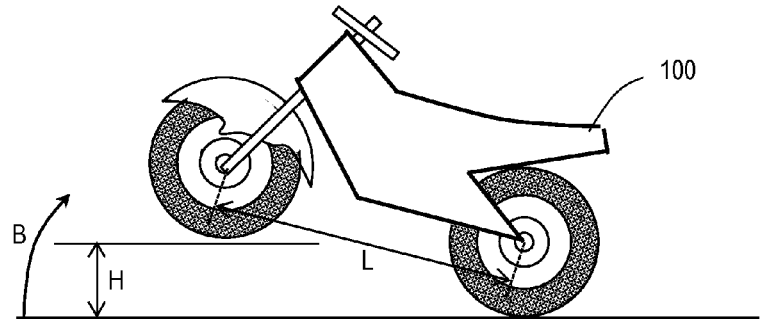
FIG. 7 is a diagram showing a calculation of determining a front wheel lift height from a pitch angle.

As shown in FIG. 5, when the front wheel lift determination circuit 56 determines that a front wheel lift has occurred, the ECU 52 suppresses the driving force (S12). First, the front wheel lift height estimation circuit 57 estimates the height by which the front wheel is lifted (S13). Specifically, since the point in time at which a front wheel lift is determined to have occurred, the front wheel lift height estimation circuit 57 subjects the pitch rate β to integration with respect to time, thus calculating a pitch angle B. Furthermore, the front wheel lift height estimation circuit 57 calculates a front wheel lift height H from the pitch angle B, and outputs it. As shown in FIG. 7, based on the wheelbase L, which is the distance between the rotation axis of the front wheel and the rotation axis of the rear wheel, the front wheel lift height H is determined as: front wheel lift height H=wheelbase L×sin(pitch angle B).

Figure 8:
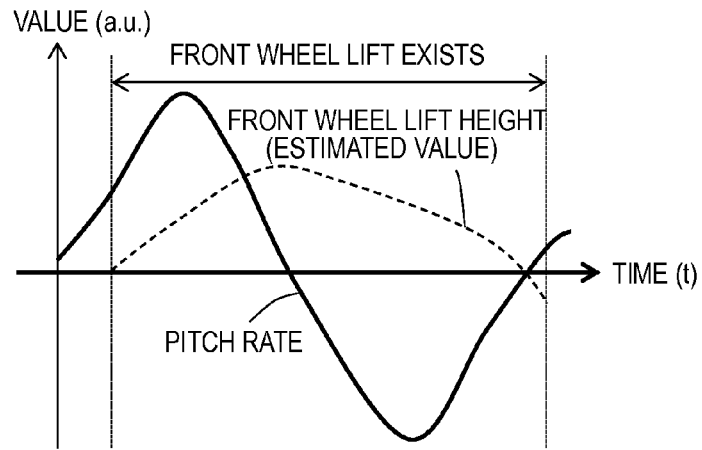
FIG. 8 is a diagram showing an example of temporal changes in the pitch rate and front wheel lift height.

FIG. 8 shows temporal changes in the front wheel lift height H and the pitch rate thus determined. The front wheel lift height H is unlikely to have an error because the pitch angle B is determined, and the front wheel lift height H is determined therefrom, since the point in time at which a front wheel lift is determined to have occurred.

As can be seen from FIG. 8, the pitch rate first increases and then decreases to zero. The front wheel lift height H is largest at this point. Thereafter, the pitch rate takes negative values, and upon reaching the smallest value, again increases to zero. At this point, the front wheel lift height H also becomes zero.

The pitch rate abruptly increases with the occurrence of a front wheel lift. Therefore, a front wheel lift suppression control which utilizes the pitch rate is able to, at the beginning of a front wheel lift, effectively reduce the driving force in accordance with the lift of the front wheel, thus controlling the front wheel from becoming lifted. Moreover, since the front wheel lift height has the wheelbase taken into account, the front wheel lift height conforms to the ups and downs of the rider's line of sight, thereby finely matching the changes in attitude as felt by the rider. Thus, by also utilizing the front wheel lift height in the front wheel lift suppression control, a control is enabled that matches the rider's feel of riding/manipulation.

As shown in FIG. 5, based on the front wheel lift height H and the pitch rate obtained from the front wheel lift height estimation circuit 57, the driving force suppression control circuit 58 determines an amount of decrease to be applied to the driving force of the engine 17 (S14), and, as a control value for the engine 17, outputs a value resulting from subtracting the determined amount of decrease from the amount of driving force which is output from the driving force estimation circuit 55 to the spark plug 39, the fuel injector 40, and the throttle actuator 41 (S15).

Specifically, the driving force suppression control circuit 58 consecutively calculates first control amounts that are based on the pitch rate and the height by which the front wheel is lifted (S14). Assuming a pitch rate B(t) and a front wheel lift height H(t) at time t, the first control amount Q(t) at time t is expressed as Q(t)=aB(t)+bH(t). Herein, a and b are predetermined constants. A point in time which lags Δt behind time t is denoted as t'. The Δt may be a unit time by which the ECU 52 controls each circuit, or a predetermined time, for example.

Figure 9:
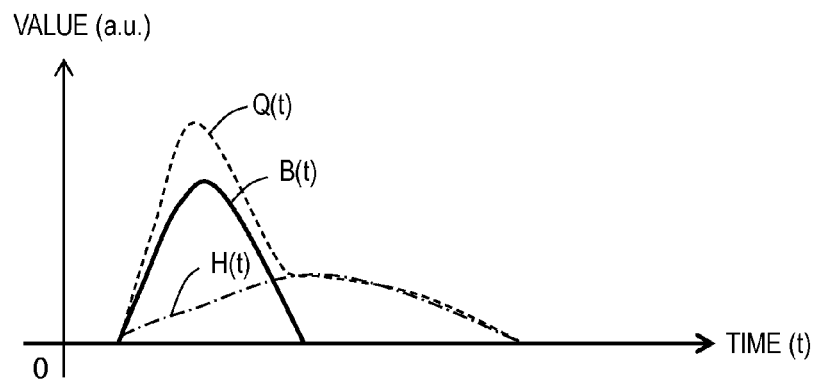
FIG. 9 is a diagram showing temporal changes in the first control amount in the example shown in FIG. 8.

As shown in FIG. 9, when the pitch rate is positive or zero, and the front wheel lift height is positive or zero, the first control amount Q(t) is determined according to the aforementioned relationship. In a region where the front wheel lift height is positive or zero and the pitch rate is negative, the first control amount Q(t) is based only on the front wheel lift height H(t), and not the pitch rate B(t). In a region where the pitch rate is positive or zero and the front wheel lift height is negative, the first control amount Q(t) is based only on the pitch rate B(t). When both of the pitch rate and the front wheel lift height are negative, the first control amount Q(t) is 0. That is:

$Q(t)=aB(t)+bH(t)(B(t)\geq 0$ and $H(t)\geq 0)$;

$Q(t)=bH(t)(B(t)<0$ and $H(t)\geq 0)$;

$Q(t)=aB(t)(B(t)\geq 0$ and $H(t)<0)$; and $Q(t)=0(B(t)<0$ and $H(t)<0)$.

The driving force suppression control circuit 58 consecutively calculates first control amounts Q(t). Assuming an amount of decrease in driving force W(t) at time t, while the first control amount Q(t) is increasing, the driving force suppression control circuit 58 decides that the first control amount Q(t) is the amount of decrease W(t) in driving force.

Specifically,

If $Q(t')-Q(t)\geq 0$, then $W(t')=Q(t)$.

Figure 10:
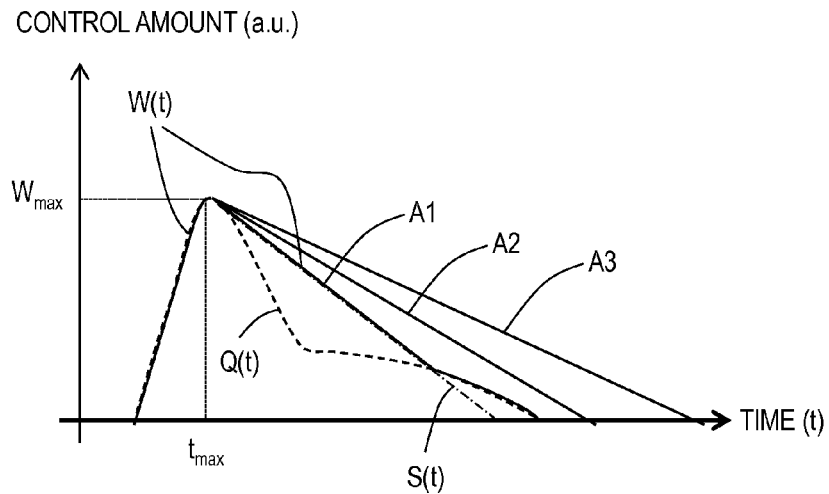
FIG. 10 is a diagram showing temporal changes in the first control amount, second control amount, and amount of decrease in the example shown in FIG. 8.

FIG. 10 shows the amount of decrease (t) in driving force. Moreover, since the point in time at which control is started, the driving force suppression control circuit 58 keeps storing amounts of decrease W(t) in driving force, and updating the maximum value Wmax and the time tmax at which the maximum value is obtained.

$W\mathrm{max}=Q(t')$ $t\mathrm{max}=t'$

By thus determining the amount of decrease W(t) in driving force, at the beginning of a front wheel lift, it is possible to effectively reduce the driving force in accordance with the lift of the front wheel, thus controlling the front wheel from becoming lifted early on.

When the first control amount Q(t) is decreasing, the driving force suppression control circuit 58 calculates a second control amount S(t), which is obtained by reducing the maximum value Wmax of the first control amount Q(t) at a constant rate over time. Moreover, the amount of decrease W(t) is determined to be whichever is the larger between the first control amount Q(t) and the second control amount S(t).

Specifically,
when $Q(t')-Q(t)<0$, the following is calculated:

$S(t')=W\mathrm{max}-W\mathrm{max}\times(t'-t\mathrm{max})\times A=$
$\quad W\mathrm{max}\{1-(t'-t\mathrm{max})\times A\}$.

Herein, A is a predetermined constant which can be chosen.

When the second control amount S(t') is equal to or greater than the first control amount Q(t'), i.e., $S(t')\geq Q(t')$, it is decided that the amount of decrease W(t') in driving force is the second control amount S(t'):

$W(t')=S(t')$.

On the other hand, when the second control amount S(t') is smaller than the first control amount Q(t'), i.e., $S(t')<Q(t')$, it is decided that the amount of decrease W(t') in driving force is the first control amount Q(t').

$W(t')=Q(t')$

In a state where the pitch rate has begun to decrease beyond its maximum value, the front wheel lift height is large and possibly near or at the maximum height, but the force acting to lift the front wheel can be considered to have begun decreasing. However, if the amount of decrease W(t) in driving force is suddenly reduced at this point, the driving force of the engine 17 will increase, possibly causing a front wheel lift again. Therefore, when the first control amount Q(t) is decreasing, the driving force suppression control circuit 58 decreases the amount of decrease W(t) at a constant rate. As a result of this, in a state where the front wheel lift is subsiding, the driving force suppression control circuit 58 can restrain the front wheel from becoming again lifted. Moreover, abrupt changes in the amount of decrease W(t) are avoided, thereby realizing a control which does not allow the rider to experience an abrupt accelerated feel or a decelerated feel.

While the amount of decrease W(t) is being decreased at a constant rate, if the front wheel lift height is equal to or greater than a predetermined value, there is a possibility that the amount of decrease W(t) may reach zero even though the front wheel is still lifted, so that the driving force fails to be suppressed. In such a case, too, the front wheel may possibly begin to be lifted again, or it may possibly take time for the front wheel to come in contact with the ground. For this reason, the first control amount Q(t') and the second control amount S(t') at time t' are compared, and if the first control amount Q(t') is greater, the first control amount Q(t') is chosen to be the amount of decrease W(t). As a result, near the end of control for reducing a front wheel lift, it is possible to appropriately reduce the driving force to end the front wheel lift.

As shown in FIG. 10, the driving force suppression control circuit 58 suppresses the driving force until the amount of decrease W(t) reaches zero. As a result, a front wheel lift can be ended without allowing the rider to experience a abrupt accelerated feel or a decelerated feel.

Figure 11:
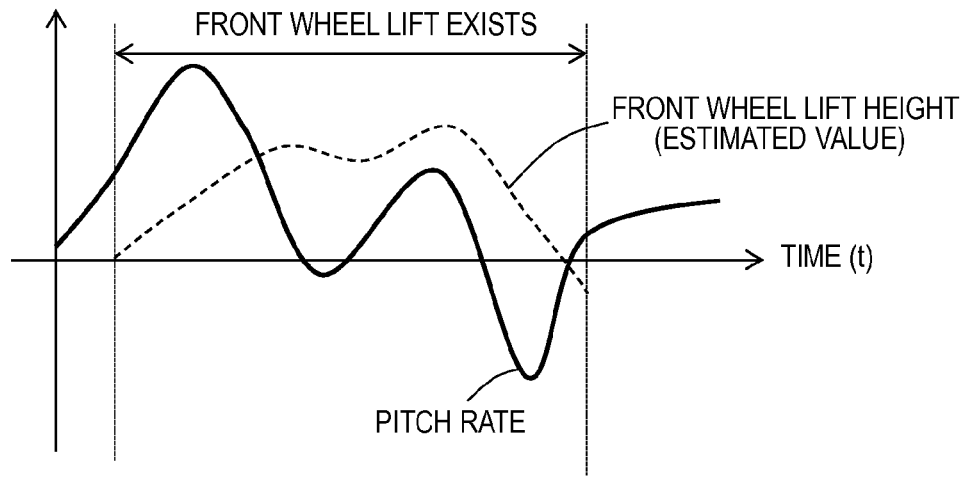
FIG. 11 is a diagram showing another example of temporal changes in the pitch rate and front wheel lift height.
Figure 12:
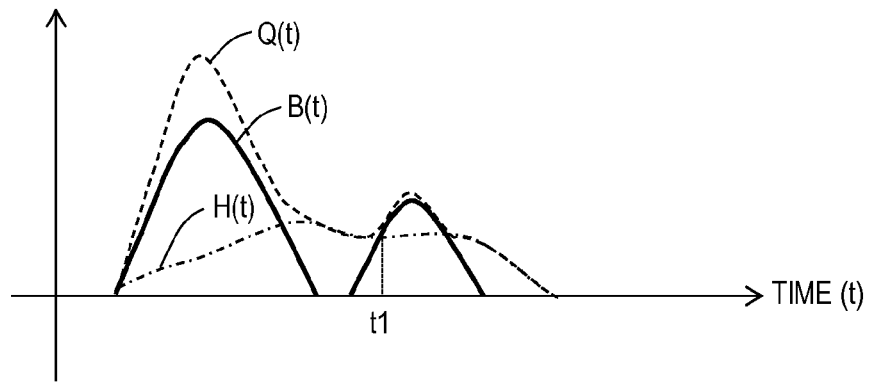
FIG. 12 is a diagram showing temporal changes in the first control amount in the example shown in FIG. 11.
Figure 13:
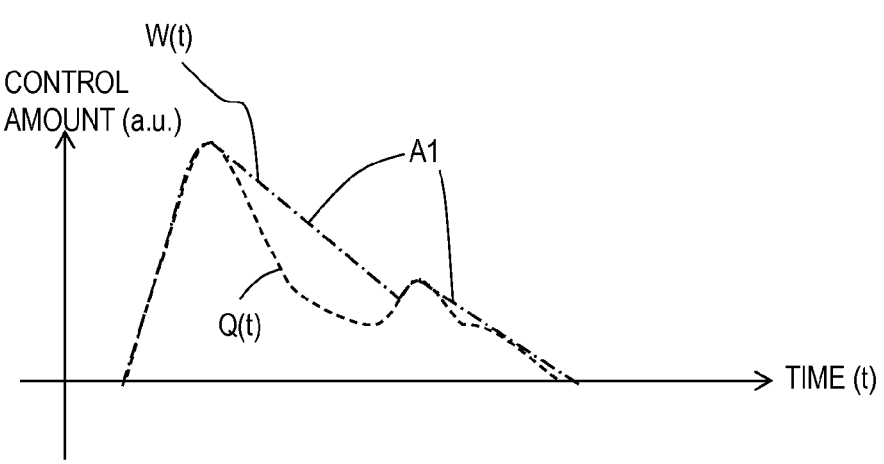
FIG. 13 is a diagram showing temporal changes in the first control amount, second control amount, and amount of decrease in the example shown in FIG. 11.

As shown in FIG. 11, even through the aforementioned control, after the pitch rate begins to decrease, or after the pitch rate once becomes zero or negative, some factor may cause the pitch rate to increase again. For example, as shown in FIG. 12, if the first control amount Q(t) begins to increase at t=t1, the driving force suppression control circuit 58 dictates after t=t1 that the first control amount Q(t) is the amount of decrease W(t) in driving force. In other words, $Q(t')-Q(t) \geq 0$ is satisfied, so:

W(t')=Q(t). As a result, from the state where the amount of decrease W(t) in driving force is decreased at a constant rate A, a transition again occurs to a state where the first control amount Q(t) is the amount of decrease W(t) in driving force. The amount of decrease W(t) in this scenario is shown in FIG. 13.

Thereafter, the aforementioned control is performed while updating the maximum value Wmax, and if the first control amount Q(t) decreases, the driving force suppression control circuit 58 calculates a second control amount S(t) which is obtained by reducing the maximum value Wmax of the first control amount Q(t) at a constant rate over time. Moreover, the amount of decrease W(t) is determined to be whichever is the larger between the first control amount Q(t) and the second control amount S(t). The constant rate A here may be the same as or different from the value in the first time.

As shown in FIG. 10, the constant rate A by which the amount of decrease W(t) is to be reduced may be varied as indicated by A1 to A3, thereby introducing different durations for which the driving force is to be suppressed. The value of the constant rate A may be set in accordance with the transmission ratio of the transmission 18, for example. Alternatively, the motorcycle 1 may include a mode input circuit which switches between a plurality of travel modes to be chosen by the rider, so that the value of the constant rate A is set in accordance with the travel mode that is selected by the rider. This permits an appropriate driving force suppression which is in accordance with the travel state of the motorcycle 1 and the rider's intention.

Moreover, as can be seen from FIG. 10, depending on the value of the constant rate A, the driving force suppression control circuit 58 suppresses the driving force even when the front wheel is not lifted. As a result, after the front wheel lift is eliminated, the state of suppressed driving force can be smoothly ended, without allowing the driving force to abruptly increase.

Moreover, as can be seen from FIG. 8 and FIG. 10, the driving force suppression control circuit 58 suppresses the driving force even in a state where the pitch rate is negative, so long as the front wheel lift height is positive. A negative pitch rate means a decreasing front wheel lift height, which indicates a state where the front wheel is about to come in contact with the ground. As mentioned earlier, if driving force suppression is stopped in this state, the front wheel may possibly begin to be lifted again, or it may possibly take time for the front wheel to come in contact with the ground; therefore, the driving force suppression control circuit 58 performs the aforementioned control to appropriately reduce the driving force, thereby ending the front wheel lift.

Note however that the constant rate A by which the amount of decrease W(t) is reduced may be changed before the amount of decrease W(t) becomes zero. In other words, the constant rate A by which the amount of decrease W(t) is reduced may be constant at least in a partial continuous period, during which the front wheel travels through a plurality of consecutive heights, and then modified until the amount of decrease W(t) becomes zero; the constant rate A by which the amount of decrease W(t) is reduced may remain constant until the amount of decrease W(t) becomes zero as described above, or the rate A may be changed before the amount of decrease W(t) becomes zero.

While the driving force suppression control circuit is still decreasing the amount of decrease W(t) by the constant rate A with the throttle closed, even if the rider rotates the grip of the handle bar to again open the throttle, there may be cases where the throttle will not open as intended by the rider, such that the motorcycle may not be accelerated as intended, because of the control by the driving force suppression control circuit 58. In such cases, it would be preferable to increase the constant rate A by which the amount of decrease W(t) is reduced, thereby ending the driving force suppression prematurely and allowing the rider to obtain a driving force as intended.

Moreover, in a state where the front wheel is not lifted, i.e., where it is determined that the front wheel lift has ended, the constant rate A by which the amount of decrease W(t) is reduced may be increased to end the driving force suppression prematurely, so that a usual control state is restored. In this case, there is little possibility for a front wheel lift to occur again, unless the amount of decrease W(t) is zeroed immediately after it is determined that the front wheel lift has ended.

Therefore, for example, the driving force suppression control circuit 58 may change the rate A in at least one of the case where the throttle is closed and the case where it is determined that the front wheel lift has ended. This realizes a motorcycle which permits truer control to the rider's intention, while reducing front wheel lifts.

Note that a determination that a front wheel lift has ended may be made by, for example, the front wheel lift determination circuit 56 by relying on the rotation speed of the front wheel, the pitch angle, and/or the front wheel lift height. Specifically, such a determination may be made by detecting an increase in the rotation speed of the front wheel, detecting the pitch angle becoming zero, or detecting the front wheel lift height becoming zero.

Thus, in accordance with the motorcycle and ECU according to the present embodiment, it is possible to determine the occurrence of a front wheel lift early on, and effectively reduce the front wheel lift by appropriately suppressing the driving force.

In the above embodiment, the driving force suppression control circuit 58 suppresses the driving force of the motorcycle by reducing the driving force of the engine 17. However, instead of suppressing the driving force of the engine 17, or in addition to suppressing the driving force of the engine 17, the braking force of the rear wheel may be controlled so as to reduce the driving force of the motorcycle. In this case, as indicated by broken lines in FIG. 3, the motorcycle 1 includes a brake modulator 38, and the ECU 52 further includes a braking force estimation circuit 59 and a braking force control circuit 60. The brake modulator 38 detects brake pressures, i.e., amounts of braking force, to the front wheel brake 10 and the rear wheel brake 26, and adjusts the brake pressures to the front wheel brake 10 and the rear wheel brake 26 in accordance with manipulations of the brake lever and the brake pedal.

The braking force control circuit 60 informs the driving force suppression control circuit 58 and the braking device 61 of the amounts of braking force that are output from the braking force estimation circuit 59. In accordance with the amounts of braking force which are output from the braking force control circuit 60, the driving force suppression control circuit 58 corrects the amount of decrease W(t) that is calculated based on the corrected pitch rate which is obtained from the corrected pitch rate acquisition circuit 54 and the height by which the front wheel is lifted which is obtained from the front wheel lift height estimation circuit 57. As a result, the output of the engine 17 is suppressed so as to arrive at a driving force which is reduced from the driving force that was intended by the rider. Because of the reduced driving force, the front wheel lift is reduced.

The straddled vehicle and controller disclosed herein are applicable to straddled vehicle for various purposes, as well as controllers thereof, and also are suitably used in straddled vehicles for motor sports purposes or the like.

While the present invention has been described with respect to exemplary embodiments thereof, it will be apparent to those skilled in the art that the disclosed invention may be modified in numerous ways and may assume many embodiments other than those specifically described above. Accordingly, it a bank rate that is received from the gyroscope 33 is intended by the appended claims to cover all modifications of the invention that fall within the true spirit and scope of the invention.

This application is based on Japanese Patent Applications No. 2014-140266 filed Jul. 8, 2104, the entire contents of which are hereby incorporated by reference.

What is claimed is:

1. A straddled vehicle comprising:
at least one front wheel;
at least one rear wheel;
a driving source which generates a driving force and rotates the at least one rear wheel with the driving force;
a braking device which lowers a rotation speed of at least the at least one rear wheel;
a first detector which acquires and outputs a pitch rate, and acquires a bank angle and a yaw rate of the straddled vehicle;
a second detector which detects and outputs information concerning rotation of the at least one front wheel; and
a controller including a front wheel lift determination circuit which monitors respective outputs from the first detector and the second detector to determine whether a front wheel lift exists or not based on whether the pitch rate satisfies a first predetermined criteria, and whether the information concerning rotation of the at least one front wheel satisfies a second predetermined criteria, wherein
the controller corrects the pitch rate to obtain a corrected pitch rate along a vertical direction, by using $$\beta'=\beta\times\cos(A)-\gamma\times\sin(A), \text{ wherein}$$

β is the pitch rate,
β' is the corrected pitch rate,
A is the bank angle, and
γ is the yaw rate,
such that the front wheel lift determination circuit makes the determination based on the corrected pitch rate, and
when the front wheel lift determination circuit determines that the front wheel lift exists, the controller reduces a driving force of the straddled vehicle by controlling the driving source or the braking device.

2. The straddled vehicle of claim 1, further comprising a third detector which detects and outputs each of the rotation speed of the at least one rear wheel, a rotation rate of the driving source, and an acceleration of the straddled vehicle along a longitudinal direction, wherein
the front wheel lift determination circuit determines whether the front wheel lift exists or not further based on
the rotation speed of the at least one rear wheel, the rotation rate of the driving source, or the acceleration, or a combination thereof, and
the pitch rate and the information concerning rotation of the at least one front wheel.

3. The straddled vehicle of claim 1, wherein the information concerning rotation of the at least one front wheel is a derivative of a rotation speed of the at least one front wheel with respect to time.

4. The straddled vehicle of claim 1, wherein the controller calculates a pitch angle which is obtained by integrating the pitch rate with respect to time,
based on the pitch angle, the controller reduces the driving force of the straddled vehicle by controlling the driving source or the braking device.

5. The straddled vehicle of claim 1, wherein the controller includes:
a front wheel lift height estimation circuit which estimates from the pitch rate, a height by which the at least one front wheel is lifted; and
a driving force suppression control circuit,
wherein based on the pitch rate and the height by which the at least one front wheel is lifted, the driving force suppression control circuit determines
an amount of decrease in the driving force, or
an amount of decrease in the rotation speed of the at least one rear wheel.

6. The straddled vehicle of claim 5, wherein the front wheel lift height estimation circuit
calculates a pitch angle by integrating the pitch rate with respect to time, and
estimates the height by which the at least one front wheel is lifted based on the pitch angle.

7. The straddled vehicle of claim 6, wherein the front wheel lift height estimation circuit estimates the height by which the at least one front wheel is lifted based on
the pitch angle, and
a distance between the at least one front wheel and the at least one rear wheel.

8. The straddled vehicle of claim 5, wherein the driving force suppression control circuit consecutively calculates values for a first control amount using the pitch rate and the height by which the at least one front wheel is lifted, for thereby determining the amount of decrease in the driving force or the amount of decrease of the rotation speed of the at least one rear wheel.

9. The straddled vehicle of claim 8, wherein
when the pitch rate is positive, the driving force suppression control circuit calculates as one of the values for the first control amount a sum of
a value resulting from multiplying the pitch rate with a predetermined coefficient, and
a value resulting from multiplying the height by which the at least one front wheel is lifted with another predetermined coefficient, and
when the pitch rate is negative, the driving force suppression control circuit calculates as another of the values of the first control amount, a value resulting from multiplying the height by which the at least one front wheel is lifted with a predetermined coefficient.

10. The straddled vehicle of claim 8, wherein, when the consecutively-calculated values of the first control amount are decreasing, the driving force suppression control circuit
calculates values for a second control amount which is obtained by reducing a maximum value of the consecutively-calculated values for the first control amount over time, and
determines in accordance with the values of the second control amount, the amount of decrease in the driving force, or the amount of decrease in the rotation speed of the at least one rear wheel.

11. The straddled vehicle of claim 10, wherein the driving force suppression control circuit calculates the values of the second control amount by reducing the maximum value by a rate A over a time, and varies the rate A before the second control amount reaches zero.

12. The straddled vehicle of claim 10, wherein the driving force suppression control circuit calculates the values of the second control amount by reducing the maximum value by a constant rate over time.

13. The straddled vehicle of claim 12, further comprising a mode input circuit which switches between a plurality of travel modes to be chosen by a rider, wherein
the constant rate is set in accordance with a travel mode of the travel modes that is chosen by the rider.

14. The straddled vehicle of claim 13, wherein even when the pitch rate is negative, the driving force suppression control circuit determines the amount of decrease in the driving force or the amount of decrease in the rotation speed of the at least one rear wheel.

15. The straddled vehicle of claim 13, wherein even when a current value of the values of the first control amount equals zero and if a current value of the second control amount is positive, the driving force suppression control circuit determines in accordance with the current value of the second control amount, the amount of decrease in the driving force or the amount of decrease in the rotation speed.

16. The straddled vehicle of claim 8, wherein when the consecutively-calculated values of the first control amount is decreasing, the driving force suppression control circuit
calculates values for a second control amount which is obtained by reducing a maximum value of the consecutively-calculated values of the first control amount by a constant rate over time, and
determines in accordance with whichever is larger between the first control amount and the second control amount, the amount of decrease in the driving force or the amount of decrease in rotation speed of the at least one rear wheel.

17. The straddled vehicle of claim 16, further comprising a transmission which transmits a driving force to the at least one rear wheel while converting revolutions of the driving source with a selected one of a plurality of transmission ratios, wherein
the constant rate is set in accordance with the selected transmission ratio of the transmission.

18. The straddled vehicle of claim 8, wherein the function is a linear combination function of a function of the pitch rate and a function of the height by which the at least one front wheel is lifted.

19. The straddled vehicle of claim 5, wherein the driving force suppression control circuit consecutively calculates values for a first control amount $Q(t)$ based on the pitch rate and the height by which the at least one front wheel is lifted, the pitch rate being $B(t)$ at time t, the front wheel lift height being $H(t)$ at the time t, and the first control amount $Q(t)$ at the time t being expressed as $Q(t)=aB(t)+bH(t)$, where a and b are predetermined constants,
further wherein based on the values for the first control amount, the driving force suppression control circuit determines the amount of decrease in the driving force or the amount of decrease of the rotation speed of the at least one rear wheel.

20. A straddled vehicle comprising:
a front wheel;
at least one rear wheel;
a driving source which generates a driving force and rotates the at least one rear wheel with the driving force;
a braking device which lowers a rotation speed of at least the at least one rear wheel;
a first detector which acquires and outputs a pitch rate, and acquires a bank angle and a yaw rate of the straddled vehicle; and
a controller including a front wheel lift determination circuit which determines whether a front wheel lift exists or not based on the pitch rate, wherein
the controller corrects the pitch rate to obtain a corrected pitch rate along a vertical direction, by using $\beta'=\beta \times \cos(A)-\gamma \times \sin(A)$, wherein $\beta$ is the pitch rate,
$\beta'$ is the corrected pitch rate,
A is the bank angle, and
$\gamma$ is the yaw rate,
such that the front wheel lift determination circuit makes the determination based on the corrected pitch rate, and
when the front wheel lift determination circuit determines that the front wheel lift exists, the controller reduces a driving force of the straddled vehicle by controlling the driving source or the braking device.

21. A straddled vehicle comprising:
a front wheel;
at least one rear wheel;
a driving source which generates a driving force and rotates the at least one rear wheel with the driving force;
a braking device which lowers a rotation speed of at least the at least one rear wheel;
a first detector which acquires and outputs a pitch rate, and acquires a bank angle and a yaw rate of the straddled vehicle;
a second detector which detects and outputs information concerning rotation of the front wheel;
a third detector which detects and outputs at least one output that includes at least one of a rotation speed of the at least one rear wheel, a rotation rate of the driving source, and an acceleration of the straddled vehicle along a longitudinal direction; and
a controller including a front wheel lift determination circuit which monitors respective outputs from the first detector, the second detector, and the third detector to determine whether a front wheel lift exists or not based on
whether the pitch rate satisfies a first predetermined criteria, and whether the information concerning rotation of the front wheel satisfies a second predetermined criteria, and
the at least one output from the third detector, wherein
the controller corrects the pitch rate to obtain a corrected pitch rate along a vertical direction, by using $\beta'=\beta \times \cos(A)-\gamma \times \sin(A)$, wherein β is the pitch rate,
β' is the corrected pitch rate,
A is the bank angle, and
γ is the yaw rate,
such that the front wheel lift determination circuit makes the determination based on the corrected pitch rate, and
when the front wheel lift determination circuit determines that the front wheel lift exists, the controller reduces a driving force of the straddled vehicle by controlling the driving source or the braking device.

22. A controller for controlling a driving source or a braking device of a straddled vehicle, the straddled vehicle including
a front wheel,
a rear wheel,
a driving source which generates a driving force and rotates the rear wheel with the driving force,
a braking device which lowers a rotation speed of at least the rear wheel,
an inertia measurement device which acquires and outputs a pitch rate, and acquires a bank angle and a yaw rate of the straddled vehicle, and
a front-wheel rotation speed sensor which detects and outputs a rotation speed of the front wheel,
the controller comprising:
a front wheel lift determination circuit which monitors the pitch rate and the rotation speed of the front wheel to determine whether a front wheel lift exists or not based on whether the pitch rate satisfies a first predetermined criteria, and whether the rotation speed of the front wheel satisfies a second predetermined criteria, wherein
the controller corrects the pitch rate to obtain a corrected pitch rate along a vertical direction, by using $$\beta' = \beta \times \cos(A) - \gamma \times \sin(A), \text{ wherein}$$

β is the pitch rate,
β' is the corrected pitch rate,
A is the bank angle, and
γ is the yaw rate,
such that the front wheel lift determination circuit makes the determination based on the corrected pitch rate, and
when the front wheel lift determination circuit determines that the front wheel lift exists, the controller controls the driving source or the braking device so that the driving force is lowered or the rotation speed of the rear wheel is lowered.

23. A method of controlling a driving source or a braking device of a straddled vehicle, the straddled vehicle including
a front wheel,
a rear wheel,
a driving source which generates a driving force and rotates the rear wheel with the driving force,
a braking device which lowers a rotation speed of at least the rear wheel,
an inertia measurement device which acquires and outputs a pitch rate, and acquires a bank angle and a yaw rate of the straddled vehicle, and
a front-wheel rotation speed sensor which detects and outputs a rotation speed of the front wheel,
the method comprising:
monitoring the pitch rate and the rotation speed of the front wheel;
correcting the pitch rate to obtain a corrected pitch rate along a vertical direction, by using $$\beta' = \beta \times \cos(A) - \gamma \times \sin(A), \text{ wherein}$$

β is the pitch rate,
β' is the corrected pitch rate,
A is the bank angle, and
γ is the yaw rate;
determining a determination indicating whether a front wheel lift exists or not based on whether the corrected pitch rate satisfies a first predetermined criteria, and whether the rotation speed of the front wheel satisfies a second predetermined criteria; and
when the determination indicates that the front wheel lift exists, controlling the driving source or the braking device so that the driving force is lowered or the rotation speed of the rear wheel is lowered.

* * * * *